Figure 1:
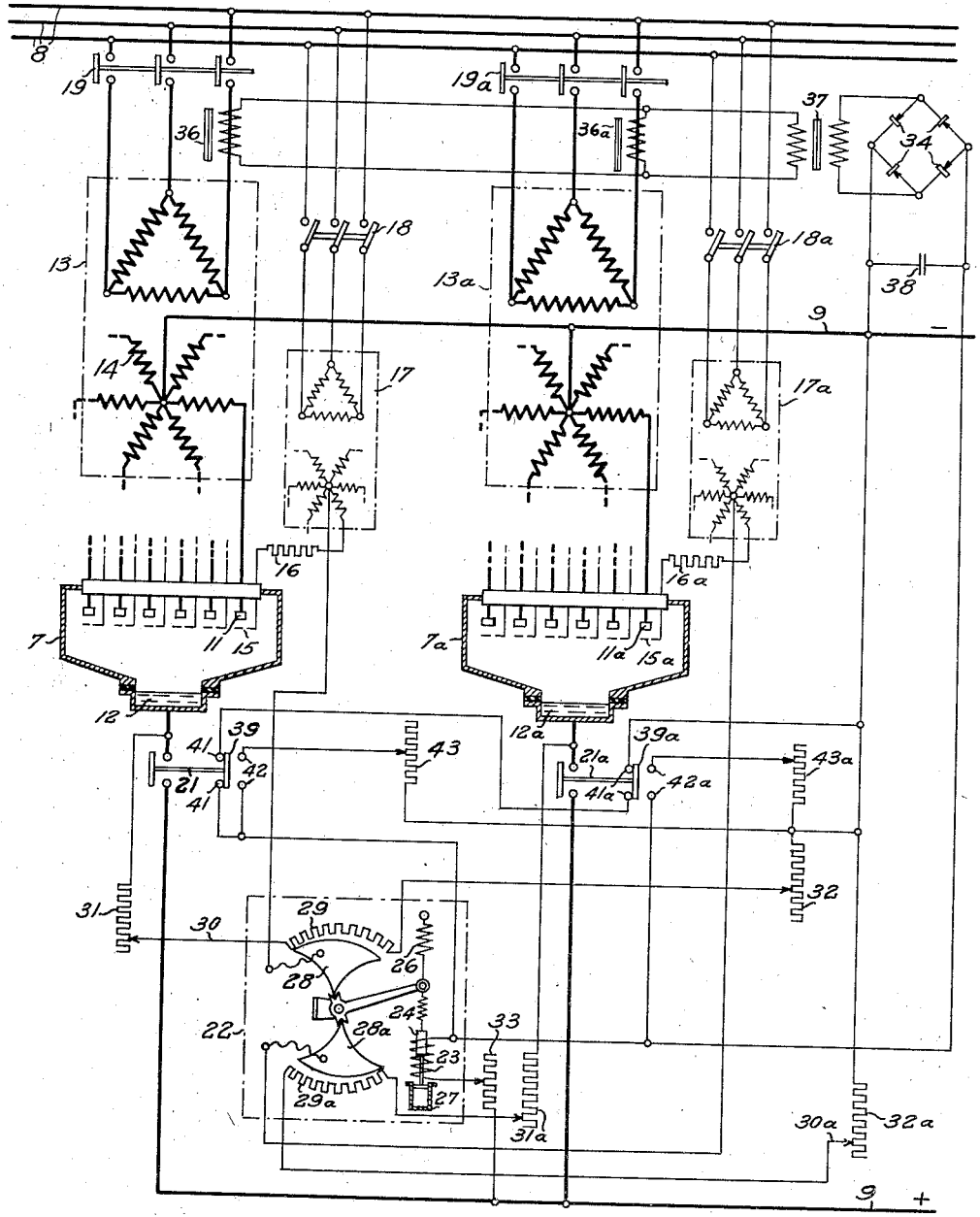

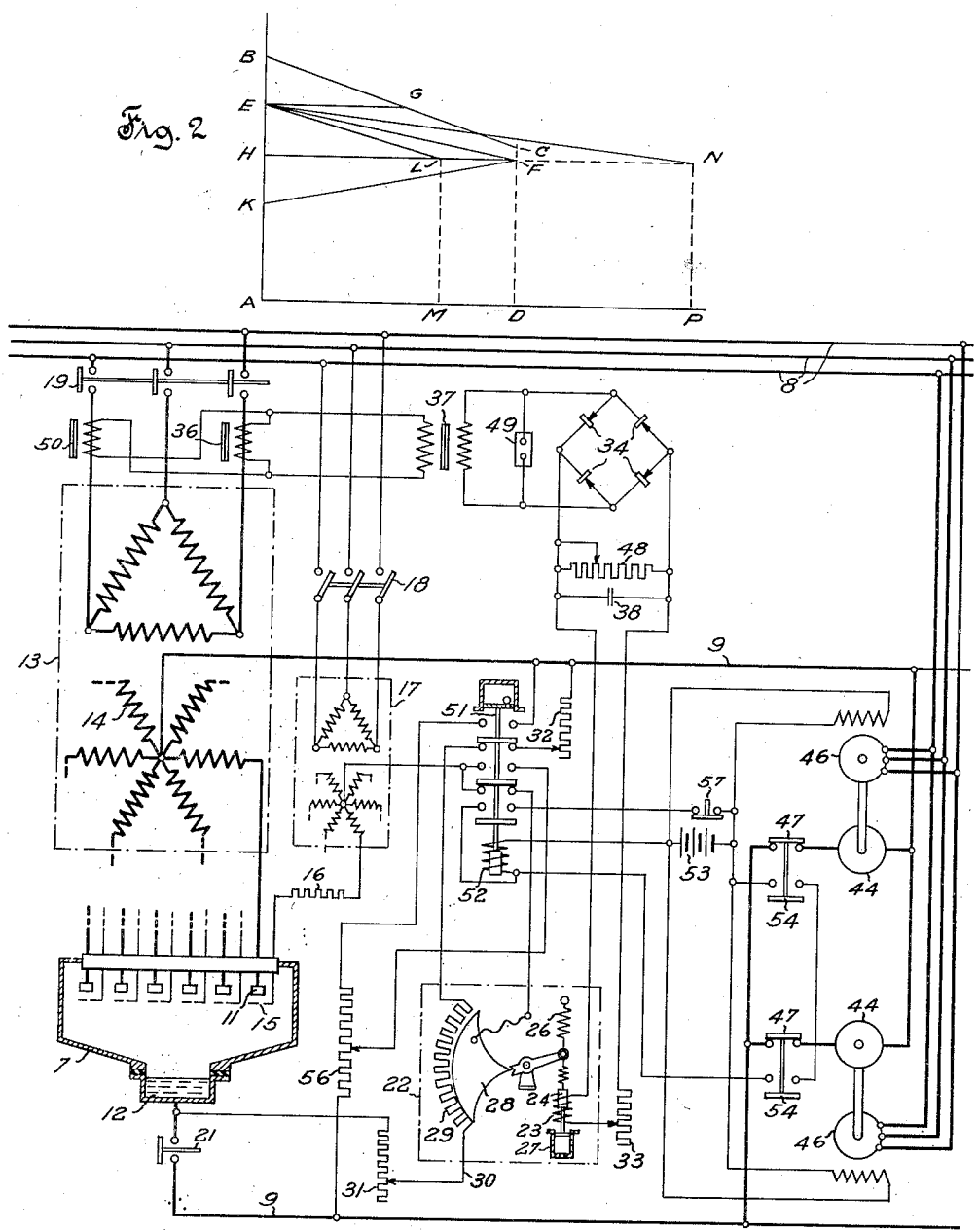

Patented Feb. 1, 1938

2,107,263

UNITED STATES PATENT OFFICE 2,107,263

ELECTRIC VALVE CONTROL SYSTEM

Harold Winograd, Milwaukee, Wis., assignor to Allis-Chalmers Manufacturing Company, Milwaukee, Wis., a corporation of Delaware Application June 10, 1935, Serial No. 25,780

16 Claims. (Cl. 175—363)

This invention relates in general to electric valve control systems, and more particularly to a system for controlling an electric valve forming part of a translating system adapted to control the supply of current to an electric circuit and which operates in parallel with other valve translating systems or with other sources of current.

In the electrical art, use is frequently made of a plurality of sources connected in parallel for supplying electric current to a common output circuit and, therethrough, ultimately to current consuming devices. It is well known that such use of parallel sources may be resorted to for a number of reasons, such as the necessity of expanding an existing installation by addition of new units to the existing units, or the distribution of sources at different points of a line to reduce its line losses. Under such conditions, it is generally necessary to provide means for controlling the sources in such a manner as to obtain a desired current distribution therebetween, but such means require adjustments which differ in dependence upon the number and the size of units operating in parallel. The readjustment of the control means, to be effected upon change in the connection of parallel units, is preferably obtained by means of suitable interlocks between such control means and other elements involved in the operation of the units, such as the switches connecting and disconnecting the different units with and from the line. The designation of source or unit is herein meant to apply to any structure operable for transforming energy in any form into electrical energy, such as dynamo electric machines, batteries, electric valve converting systems, and other systems capable of operating in parallel with similar or dissimilar sources to jointly supply current to current consuming devices.

It is therefore one of the objects of the present invention to provide a control system for an electric valve translating system connected with an output circuit common to other sources of current, by which the control means of the valve are affected by an element involved in the operative connection and disconnection of other sources of current with and from the output circuit.

Another object of the present invention is to provide a control system for an electric valve translating system connected with an output circuit common to other sources of current, by which the conductivity of the valve is controlled in response to an operating condition thereof, and in which the responsive element of the control means is affected by a step of the operative connection and disconnection of other sources of current with and from the output circuit.

Another object of the present invention is to provide a control system for a source of electric current connected with an output circuit common to other sources of current, by which the operation of the source is regulated automatically or manually in dependence upon the operative connection and disconnection of some of the other sources.

Another object of the present invention is to provide a control system for some of a plurality of sources associated with a common output circuit, by which the operation of all controlled sources is regulated by single means in such a manner as to impart to each such source a predetermined output characteristic regardless of the number of other sources in operation.

Figure 4:
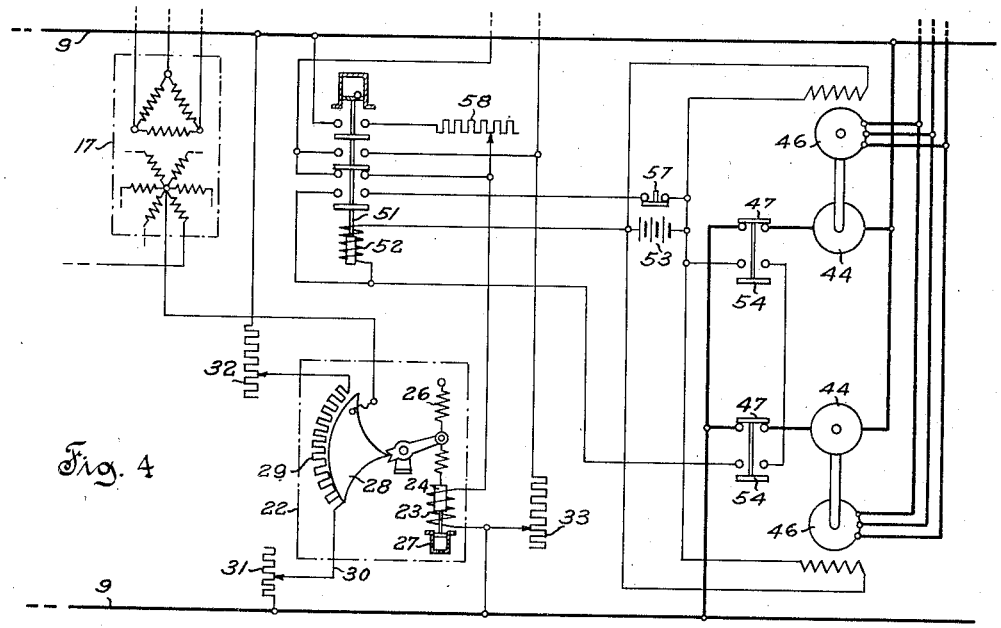
Figure 5:
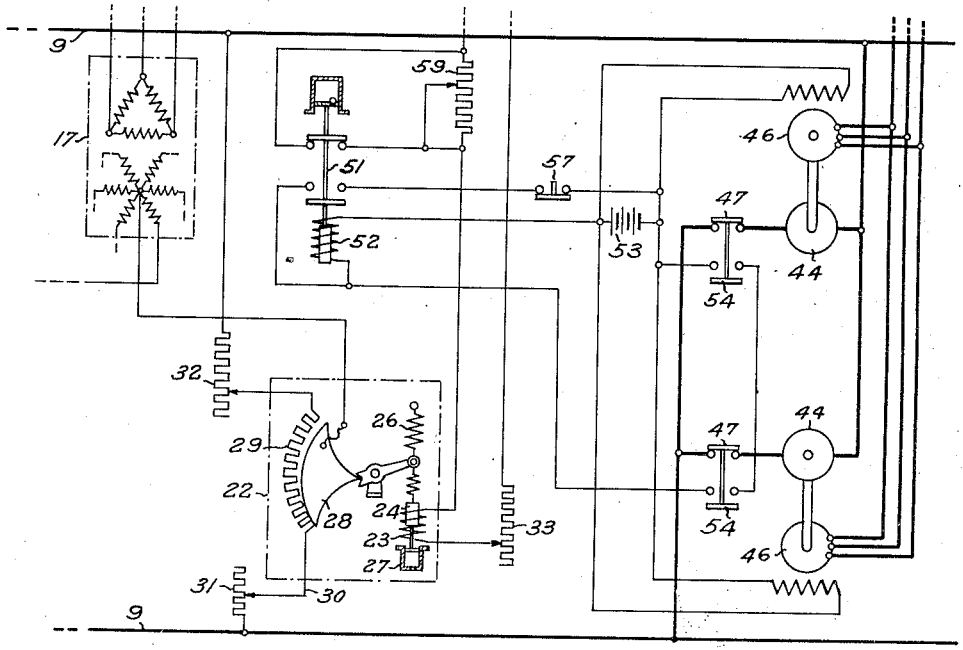

Objects and advantages other than those above set forth will be apparent from the following description when read in connection with the accompanying drawings, in which:

Fig. 1 diagrammatically illustrates one embodiment of the present invention applied to the control of two electric current rectifying systems controlled by a single regulator and so arranged that each rectifying system has imparted thereto a predetermined output characteristic irrespective of whether or not the other system is in operation;

Fig. 2 is a diagram of different output voltage characteristics obtainable with the system illustrated in Fig. 1;

Fig. 3 diagrammatically illustrates another embodiment of the present invention, applied to the control of an electric current rectifying system arranged to deliver constant current when operating in parallel with other current sources, and to have a drooping voltage characteristic when operating alone;

Fig. 4 diagrammatically illustrates a portion of a modified embodiment of the present invention differing from the embodiment illustrated in Fig. 3 in that the rectifying system delivers current at substantially constant voltage when operating alone; and Fig. 5 diagrammatically illustrates a portion of another modified embodiment of the present invention differing from the embodiment illustrated in Fig. 3 in that the rectifying system operates at constant current of a value when operating alone and of a different value when operating in parallel with other sources.

It will be understood that elements illustrated in any one of the figures may also be utilized in combination with elements illustrated in others of the figures to form further embodiments of the invention.

Referring more particularly to the drawings by characters of reference, reference numeral 7 designates an electric valve constituting part of a translating system utilized for controlling the flow of current between a first electric circuit or line 8 and a second circuit or line 9. Valve 7 may be of any of the types known in the art provided with one or more anodes 11 cooperating with a cathode 12 to form a plurality of valve paths, but a plurality of valves each comprising one of anodes 11 and a separate cathode enclosed within a separate casing may also be utilized instead of a single valve structure. Lines 8 and 9 may carry current under any desired form, the translating system being arranged in a suitable manner depending upon the nature of the current to be transmitted therethrough. In the embodiment illustrated herein, line 8 is assumed to be a polyphase alternating current line and line 9 a direct current line, line 8 being accordingly connected with anodes 11 through a transformer 13 having a secondary winding 14 provided with a neutral point connected with one of the conductors of line 9, the other conductor of line 9 being connected with cathode 12.

The flow of current through valve 7 is controlled by means of control electrodes severally associated with anodes 11, and which may be of the type causing the associated cathode to become intermittently emissive if a plurality of cathodes are utilized. Such control electrodes are herein illustrated as grids 15 severally connected with cathode 12 through circuits comprising resistors 16, the secondary phase portions of a transformer 17 energized from line 8 through a switch 18, and through further connections to be described in detail hereinafter and arranged to superpose a negative voltage on the alternating voltage impressed between the control electrodes and the cathode by transformer 17. Cathode 12 is provided with suitable means for bringing into and maintaining such catode in electron emitting condition, such means being well known and therefore not shown.

As is well known, a system so connected is operable as a rectifying system or as an inverting system depending upon the phase relation of the winding portions of transformers 13 and 17 connected with associated anodes and control electrodes. It will be assumed that transformer 17 is so connected as to render valve 7 operable to rectify current received from suitable sources (not shown) through supply line 8 and transformer 13, and thus to function as a source of current for its output line 9. Transformer 13 is preferably connected with line 8 through a switch 19, the connection of line 9 with winding 14 or with cathode 12 being controlled by another switch 21. As is the general practice in rectifier installations, switch 19 is to be closed first to render valve 7 operative before closing switch 21, such practice being enforced if desired by the provision of suitable interlocks between the switches, or by causing switch 21 to be operated by current supplied by valve 7. Switch 21 thus controls the operative connection of valve 7 with line 9.

Valve 7 is arranged to operate in parallel with other sources of current connected with line 9, only one other source consisting of a valve 7a being shown to simplify the drawings. Valve 7a forms part of a system similar to that of valve 7, similar elements being designated by the same reference characters in both systems except that the elements associated with valve 7a are distinguished by a letter "a" joined to their numerals. Valve 7a is represented as receiving current from line 8, although such valve may also receive current from another source of supply even though connected with line 9 in parallel with valve 7.

The conductivities of valves 7 and 7a are jointly controlled by a single regulator 22. The regulator is actuated by a single sensitive element, such as a solenoid 23 acting on a core 24 against the action of a spring 26 and under control of suitable damping means such as a dashpot 27. Core 24 actuates a pair of conductive sectors 28, 28a severally connected with the neutral points of the secondary windings of transformers 17, 17a. Such sectors constitute movable taps for a pair of associated resistors 29, 29a severally connected between cathodes 12, 12a and the negative conductor of line 9 through rheostats 31, 32 and 31a, 32a. Such resistors and rheostats thus constitute a pair of automatically adjustable voltage dividers 30, 30a for impressing on control electrodes 15, 15a potential components negative with respect to the potential of the associated cathode 12 or 12a taken as datum. Such potential components are superposed on the alternating potential components impressed on the control electrodes by the secondary windings of transformers 17 and 17a.

As shown in Fig. 1, solenoid 23 may be connected across line 9 through an adjusting rheostat 33. The connection also includes a group of rectifying devices 34 receiving current through a step up transformer 37 from current transformers 36 and 36a in the connections of transformers 13 and 13a with line 8. The output terminals of rectifying devices 34 are preferably bridged by a capacitor 38 provided for rendering the output voltage of such devices more uniform. When both switches 21 and 21a are open, an element 39, 39a of each of such switches bridges contacts 41, and 41a inserted in series in a short circuit provided across rectifying devices 34. The purpose of such short circuit is to provide a path for the secondary current surge of transformer 37 resulting from the magnetizing current surge frequently occurring upon connection of transformer 13 or 13a with line 8 by closure of switch 19 or 19a. If valves 7 and 7a are connected to operate in parallel with additional valves (not shown), such valves are also provided with associated switches similar to switch 21 and having elements similar to element 39 controlling additional contacts in series with contacts 41 and 41a.

When switch 21 is closed, the associated element 39 closes contacts 42 connecting a resistor 43 across the output terminal of rectifying devices 34 and, therefore, also across line 9 through coil 23 and rheostat 33. The switches, such as 21a, associated with valve 7a and with any other valve (not shown) operating in parallel therewith are also arranged to connect additional resistors, such as 43a, in parallel with resistor 43 upon closure of such switches. Coil 23 is thus made responsive to the joint output voltage of the valves impressed on line 9, plus cumulative operating condition of the several valves or sources, which is the voltage drop produced in the resistors such as 43 by the flow therethrough of rectified current porportional to the joint flow of current, if any, through the several valves. If the different valves and their associated transformers are substantially identical, resistors 43 are adjusted to have equal effective resistances.

If the valves are of different current carrying capacities, the associated resistors 43 are adjusted to have conductances proportional to the ratings of the associated units. In this manner, when such units as are operatively connected with line 9 are jointly carrying their aggregate rated currents, the voltage drop caused in the resistances, such as 43, by the flow of rectified current supplied thereto by the transformers such as 36, is always of a predetermined value regardless of the number of units in operation. Such voltage drop will have proportionately different values at other values of the aggregate current of the valves relative to their aggregate rated current. It will be understood that device 34 may also be connected to impress on the resistors such as 43 a rectified voltage of polarity opposite to that of line 9 to impart a different characteristic to the valves. If valves in number greater than two are to be jointly controlled by regulator 22, the regulator may be provided with a larger number of sectors 28 and of resistors 29, or several units may be jointly controlled by one of the sectors, the switches such as 21 then being preferably provided with additional auxiliary contacts for controlling the effective resistances of rheostats 31 and 32 in dependence upon the number of operating units. It will be understood that the valves such as 7 may also be operated in parallel with other sources which are not controlled by regulator 22.

In operation, assuming line 8 to be energized by the sources (not shown) connected therewith, valve 7 may be rendered operative by rendering cathode 12 conductive and by closing switches 18 and 19 to thereby energize anodes 11 and control electrodes 15. Voltage divider 30 may then receive current from valve 7 at a voltage depending upon the degree of action of control electrodes 15 on anodes 11. Solenoid 23 of regulator 22 then still being without current, the regulator is in the position shown and sector 28 thus impresses on the control electrodes 15 the smallest possible negative potential component from voltage divider 30. Each control electrode thus reaches the critical potential, i. e., substantially cathode potential, at which it releases the flow of current through the associated anode, at the earliest possible point of the anode voltage cycle, with the result that valve 7 is operative to deliver current at the highest possible output voltage represented by ordinate AB in Fig. 2.

Upon closure of switch 21, valve 7 accordingly delivers current to line 9, and to any current consuming devices connected therewith. If sector 28 remained in the position shown, the output voltage of valve 7 would be inherently drooping and would follow a characteristic line such as line BC in Fig. 2. Solenoid 23 of regulator 22 is, however, then energized, current flowing from line 9 through rheostat 33, solenoid 23, contacts 42 bridged by element 39, and resistor 43. Assuming that the action of solenoid 23 on core 24 is uniform at all points of its stroke, regulator 22 will remain stationary in any of its operating positions only if the current in solenoid 23 is at substantially a predetermined single value, and will depart from such position when the current in solenoid 23 departs materially from such value to thereby affect the operation of valve 7 in such a manner that the current in solenoid 23 returns to the predetermined value for which it is adjusted.

In the absence of current transformer 36, regulator 22 would thus tend to maintain the output voltage of valve 7 at a constant value. In general, valve 7 is of the continuously controllable type in which the conductivity cannot be continuously varied in value during the flow of current through the valve; transformer 17, voltage divider 30 and regulator 22 then cooperate to control in time the periods of presence or absence of conductivity of valve 7 or of the several anode circuits of valve 7, and thus control the average value of the output voltage of the valve. Such value is then representative of the effective conductivity of the valve. If the output voltage of valve 7 is higher than the desired value, regulator 22 moves sector 28 away from the position shown to thereby increase the negative potential component impressed on control electrodes 15 and thus delays the operating periods of each anode 11 relatively to the voltage cycle thereof to an extent such as to return the voltage of line 9 to the desired value. The regulator conversely increases the voltage of the valve when such voltage is too low.

The regulator thus would impart to valve 7 a flat output voltage characteristic such as EG in Fig. 2. Such characteristic would remain flat only up to its junction G with line BC and from then would merge with line BC because, as is well known, the output voltage of a valve may be decreased but not increased by the action of the control electrodes thereof. As a result of the action of current transformer 36, the flow of current through solenoid 23 which is dependent upon the voltage of line 9, tends to be given increments proportional to the value of the flow of current through valve 7, and regulator 22 therefore moves to decrease the output voltage of valve 7 to thereby maintain the current in the solenoid at a constant value. Such action results in imparting to valve 7 a drooping characteristic of predetermined slope such as line EF in Fig. 2 corresponding to a rated current carrying capacity represented by abscissa AD. Such slope may be changed by adjustment of resistor 43. By disconnecting current transformer 36 and changing the adjustment of rheostat 33, a flat characteristic such as HF may also be obtained. By further adjustment of rheostat 33 and by reversing the output connections of rectifying devices 34, a rising characteristic of adjustable slope such as KF may be obtained.

Instead of supplying line 9 with current through valve 7 according to a characteristic EF, the line could also be supplied through valve 7a, such valve preferably having the same no load and full load voltages as valve 7 and accordingly delivering current up to its rated current carrying capacity, represented by abscissa AM, under voltages represented by characteristic EL. Valves 7 and 7a thus being assumed of different current ratings, it will be apparent that the control electrode circuits of valve 7a, and more particularly resistor 29a, are to be dimensioned differently from the control electrode circuits of valve 7, and more particularly resistor 29. If valves 7 and 7a were designed for the same current carrying capacity, they would each operate separately at voltages represented by a single characteristic EF.

Assuming now valve 7 to be in operation, valve 7a may also be connected in parallel therewith. Upon closure of switch 21a, valve 7a is operatively connected with line 9 to supply current thereto, and element 39a connects resistor 43a in parallel with resistor 43. In general, it will be desired that the joint no load output voltage of the two valves be substantially equal to the no load voltage AE of either of such valves operating alone. As, however, the resistance of the circuit of solenoid 23 has been lowered by insertion of resistor 43a in parallel with resistor 43, regulator 22 will tend to lower the no load voltage of the line 9 below the value AE. Such effect may be rendered negligible by selecting resistors 43 and 43a of low value compared to the resistance of rheostat 33 and solenoid 23 so that the no load voltage is substantially unaffected by the change of connection. The connection of resistor 43a to the circuit may also be compensated by controlling the adjustment of rheostat 33 through an additional contact of switch 21a, to thereby maintain the no load voltage exactly at its previous value AE. When current is drawn by the current consuming devices connected with line 9, regulator 22 acts to regulate the voltages of valves 7 and 7a in the manner above described. Valve 7a then operates as a source of current connected to its output circuit 9 for supplying current thereto, switch 21a controlling the operation of such source with circuit 9. Valve 7 has the conductivity thereof controlled by means including regulator 22 responsive to an operating condition of such valve, and including element 39a of switch 21a. Such element controls the operation of regulator 22 by modifying the degree of responsiveness thereof to the magnitude of flow of current through valve 7. Regulator 22 also constitutes a single means operable to control the operation of sources 7 and 7a, and of any others to be jointly controlled therewith, responsive to a cumulative operating condition of such sources for regulating the flow of current therethrough and is controlled by the element such as 39 of any of the switches 21 controlling the operative connection of any one of such sources with line 9. Such regulation is effected by jointly controlling the conductivity of all the valves.

It will be observed that the operation of regulator 22 is affected to an extent proportional to the magnitude of the joint flow of current through the valves by the action of the current transformers such as 36, the current of such transformers being added in transformer 37 to impress on the resistors, such as 43, a voltage proportional to the total flow of current supplied by the valves to line 9. As a result of the parallel connection of the resistors such as 43, which are of conductances proportional to the current carrying capacities of the associated units, such voltage, for any given value of the total current through the valves, is therefore also of a magnitude inverse of the aggregate current carrying capacity of the valves operatively connected with line 9. In particular, when valves 7 and 7a jointly carry a current represented by abscissa AP in Fig. 2, equal to the sum of the full load currents AD and AM of the valves, the voltage jointly impressed by current transformers 36 and 36a on resistors 43 and 43a is of the same magnitude as the voltage impressed by either current transformer on the associated resistor during separate operation of the associated valve. The regulator therefore reaches the same position as during full load operation of either valve 7 or 7a operating separately, and regulates the joint voltage of the two valves to the same value as during separate operation of the valves. As the aggregate load of the valves was assumed to be equal to the sum of the rated currents of such valves, and as the valves operate severally under the full load voltage thereof, each valve will carry its rated current as when operating separately and will thus function under conditions represented by points F and L. For similar reasons, the operation of each of valves 7 and 7a when carrying current under a characteristic represented by line EN will be represented by other points of characteristics EF and EL, and each valve thus retains during joint operation the same characteristic as during separate operation.

Regulator 22 is thus responsive to a cumulative operating condition, i. e., to the cumulative value of the operating currents of valves 7 and 7a, to impart to valve 7 a predetermined output voltage characteristic during individual operation of such valve. Switch 21a operatively connects and disconnects valve 7a to and from line 9, element 39a of such valve cooperating with resistor 43a for causing regulator 22 to continue to impart to valve 7 the same predetermined characteristics when switch 21a is closed. Instead of controlling the connection of resistor 43 by means of switch 21a, such connection could be controlled by any other element involved in any step of the operative connection and disconnection of valve 7a with and from line 9, whereby such control may be effected within a reasonably short time interval before or after closure of switch 21a. For example, element 39a may be replaced by an auxiliary contact member of switch 19a, or by a member controlled by the ignition apparatus of cathode 12a, or by a current relay responsive to the flow of current through valve 7a. Such means may all be utilized in the method of operating the translating system, which includes the steps of connecting valve 7 between lines 8 and 9, regulating the conductivity of the valve in dependence upon variations of the magnitude of the flow of current between such lines or of any other operating condition of either of such lines to impart to valve 7 a predetermined output voltage characteristic, connecting valve 7a in parallel with valve 7, and modifying the dependence of the regulation of valve 7 on the variations of the flow of current between the lines, or of any other operating condition relied upon to continue to impart the same output voltage characteristic to valve 7.

In the embodiment illustrated in Fig. 3, valve 7 only is to be controlled by regulator 22, other sources operating in parallel therewith being represented by a plurality of generators 44 severally provided with suitable driving means, such as motors 46 energized from line 8. The operative connection of each generator 44 with line 9 is controlled by a switch 47. In such an installation, it is generally advantageous to so regulate the valve as to maintain the flow of current therethrough at its maximum rated value so as to obtain the highest possible operating efficiency of the plant, and to regulate the generators 44 to deliver current at the desired voltage in amount corresponding to the difference between the load current drawn from line 9 and the rated current of valve 7. Regulator 22 is accordingly arranged to be responsive only to the magnitude of the flow of current through valve 7 by connecting solenoid 23 and rheostat 33 across the output terminals of rectifying devices 34. A surge protective device 49 may be connected across one of the windings of transformer 37. A rheostat 48 may be connected across the output terminals of devices 34 to cooperate with rheostat 33 in adjusting the flow of current through solenoid 23.

Transformer 37 is shown as being supplied by transformer 36 connected in series with one phase of transformer 13 and by another transformer 50 in series with another phase of the transformer 13, such transformers being usually provided and connected as shown for supplying the protective devices (not shown) associated with valve 7. Voltage divider 30 includes the contacts of a time delay relay 51 having a coil 52. Such coil is deenergized when at least one of switches 47 is closed, and is energized from a suitable source, such as a battery 53, through elements 54 of switches 47 when both switches are open. Relay 51 then disconnects transformer 17 from sector 28 and connects such transformer with the adjustable tap of a voltage divider 56 connected across line 9. For every adjustment of the tap of voltage divider 56, the characteristic of valve 7 is a line having a predetermined slope somewhat less steep than the slope of the inherent characteristic BC of valve 7 operating without control electrodes. Relay 51 is provided with holding contacts which lock the relay in the energized position, so that the relay may return to the position shown only upon reclosing of at least one of switches 47 and upon momentary opening of a push button switch 57.

Valve 7 and the group of generators 44 thus constitute two sources connected with line 9 for supplying current thereto. The conductivity of valve 7 is controlled by means including regulator 22 which is responsive to the magnitude of the flow of current through valve 7 for regulating the flow of current therethrough. Switches 47 control the connection of generators 44 with line 9 and also control elements 54 operable in one of the positions of the switches to disconnect regulator 22 from transformer 17, thereby neutralizing the action of the regulator. Relay 51 then substitutes therefor static voltage divider 56 cooperating with transformer 17 to impart to valve 7 different drooping characteristics for each adjustment of the voltage divider.

Voltage divider 56 may be so adjusted that when generators 44 are disconnected by operation of switches 47, valve 7 will supply line 9 with current at a voltage such that the permissible maximum flow of current through the valve is not exceeded. If the disconnection of generators 44 is to be of considerable duration, the output voltage of valve 7 may be lowered below the normal operating value thereof to an extent such that the continuous current carrying capacity of the valve is not exceeded. If such disconnection is to be of short duration, the output voltage of valve 7 may be decreased to a lesser extent, to take advantage of the ability of the valve to carry certain overloads for a limited period.

The regulator may also be so controlled that when generators 44 are disconnected from line 9, the regulator will substantially maintain the output voltage of valve 7 at a constant value. As shown in Fig. 4, such result is obtained by utilizing relay 51 to disconnect solenoid 23 from current transformer 36, thus rendering regulator 22 unresponsive to the magnitude of the flow of current through valve 7, such relay being operable in one of the positions thereof to reconnect solenoid 23 across line 9 through a rheostat 58, thereby rendering regulator 22 responsive only to the magnitude of the output voltage of valve 7.

If the loads connected with line 9 are of a nature such that they are to be supplied with current at widely varying voltages, such as a bank of electrolytic cells connected in series in variable numbers, the regulator may be so controlled that when valve 7 is operating separately the regulator will substantially maintain the flow of current through the valve at a permissible overload value. As shown in Fig. 5, such result is obtained by utilizing relay 51 to insert in series with solenoid 23 an adjustable resistor 59. Upon such insertion, a greater portion of the rectified secondary current of transformer 37 flows through resistor 48, and a lesser portion through solenoid 23, so that regulator 22 will take a position such as to cause the flow of current through valve 7 to increase until the flow of current through solenoid 23 is returned to the value for which spring 26 is adjusted.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, an input circuit, an output circuit, an electric valve connected with said circuits for controlling the flow of current therebetween, a source of electric current connected with one of said circuits for supplying current thereto, means for controlling the operation of said source, means for controlling the conductivity of said valve, means responsive to an operating condition of said valve for controlling the second said means, and means controlled by the first said means and operable in one of the positions thereof to render the third said means unresponsive to said operating condition while said valve is maintained conductive.

2. In combination, an electric current line, a first source of current and a second source of current both connected with said line for supplying electric current thereto, means responsive to an operating condition of the first said source for regulating the flow of current therethrough, means for controlling the connection of the second said source with said line, and means controlled by the second said means operable in one of the positions thereof to render the first said means unresponsive to said operating condition.

3. In an electric translating system, an input circuit, an output circuit, an electric valve connected with said circuits for controlling the flow of current therebetween, a source of electric current connected with one of said circuits for supplying current thereto, means for controlling the operative connection of said source with said one of said circuits, means for controlling the conductivity of said valve including means responsive to an operating condition of said valve, and means controlled by the first said means operable in one of the positions thereof to render the third said means responsive to another operating condition of said valve.

4. In an electric translating system, an input circuit, an output circuit, an electric valve connected with said circuits for controlling the flow of current therebetween, a source of electric current connected with one of said circuits for supplying current thereto, means for controlling the operative connection of said source with said one of said circuits, means for controlling the conductivity of said valve including means responsive to the magnitude of the flow of current therethrough, and means controlled by the first said means for controlling the rate of response of the third said means.

5. In an electric translating system, an input circuit, an output circuit, an electric valve connected with said circuits for controlling the flow of current therebetween, a source of electric current connected with one of said circuits for supplying current thereto, means for controlling the operative connection of said source with said one of said circuits, means for controlling the conductivity of said valve including means responsive to the magnitude of the flow of current therethrough, and means controlled by the first said means operable in one of the positions thereof to render the third said means responsive to the output voltage of said valve.

6. In an electric translating system, an input circuit, an output circuit, an electric valve connected with said circuits for controlling the flow of current therebetween, a source of electric current connected with one of said circuits for supplying current thereto, means for controlling the operative connection of said source with said one of said circuits, means for controlling the conductivity of said valve including means for substantially maintaining the flow of current therethrough at a constant value, and means including an element of the first said means operable in one of the positions thereof to cause the second said means to regulate the flow of current through said valve at a substantially constant voltage.

7. In an electric translating system, an input circuit, an output circuit, an electric valve connected with said circuits for controlling the flow of current therebetween, a source of electric current connected with one of said circuits for supplying current thereto, means for controlling the operative connection of said source with said one of said circuits, means for controlling the conductivity of said valve, means responsive to an operating condition of said valve for controlling the second said means, and means controlled by the first said means and operable in one of the positions thereof to neutralize the action of the third said means while said valve is maintained conductive.

8. In an electric translating system, an input circuit, an output circuit, an electric valve connected with said circuits for controlling the flow of current therebetween, a source of electric current connected with one of said circuits for supplying current thereto, means for controlling the operative connection of said source with said one of said circuits, means for controlling the conductivity of said valve including means responsive to an operating condition of said valve, and means controlled by the first said means and operable in one of the positions thereof to disconnect the third said means from the second said means.

9. In an electric translating system, an input circuit, an output circuit, an electric valve connected with said circuits for controlling the flow of current therebetween, a source of electric current connected with one of said circuits for supplying current thereto, means for controlling the operation of said source, means for controlling the conductivity of said valve including means for substantially maintaining the flow of current therethrough at a constant value, static means operable with the second said means to impart to said valve drooping output voltage characteristics, and means including an element of the first said means operable in one of the positions thereof to disconnect the third said means from the second said means and to substitute therefor the said static means.

10. In combination, a plurality of sources of current adapted to be jointly regulated and to jointly supply current to an electric circuit, single means for controlling the operation of all said sources to regulate the flow of current therethrough, means for controlling the external connections of one of said sources, and means controlled by the second said means for controlling the action of the first said means.

11. In combination, an electric current line, a plurality of sources of current adapted to be jointly regulated and connected with said line for supplying current thereto, single means responsive to a joint operating condition of said sources for regulating the flow of current therethrough, means for controlling the connection of one of said sources with said line, and means controlled by the second said means for controlling the rate of response of the first said means.

12. In combination, an electric current line, a plurality of sources of current adapted to be jointly regulated and connected with said line for supplying current thereto, means responsive to a cumulative operating condition of said sources to impart to one of said sources a predetermined output voltage characteristic during individual operation thereof, switch means for operatively connecting and disconnecting another of said sources to and from said line, and means including an element of said switch means for causing the first said means to impart to said one of said sources the said predetermined characteristic when said switch means is in the closed position thereof.

13. In an electric translating system, a pair of electric valves adapted to jointly control the flow of current between electric circuits, means for controlling the conductivity of said valves including a single means responsive to a cumulative operating condition of said valves, switch means for controlling the connections of one of said valves, and means including an element of the second said means for controlling the rate of response of the second said means.

14. In an electric translating system, an input circuit, an output circuit, a pair of electric valves connected with said circuits for controlling the flow of current therebetween, means for controlling the conductivity of said valves including a single means responsive to a cumulative operating condition of said valves to impart to one of said valves a predetermined output voltage characteristic during individual operation thereof, means for connecting and disconnecting said circuits by way of another of said valves, and means including an element of the third said means operable to cause the second said means to impart to said one of said valves the said predetermined characteristic when the third said means is in the connecting position thereof.

15. In an electric translating system, an input circuit, an output circuit, a plurality of electric valves arranged to be jointly regulated and connected with said circuits for controlling the flow of current therebetween, means for controlling the conductivity of all said valves including a single means responsive to the magnitude of the joint flow of current through all said valves, means for severally connecting and disconnecting said circuits by way of the different said valves, and means including elements of the third said means operable to cause the current supplied to the second said means to be effected to an extent proportional to the magnitude of the joint flow of current through all said valves and inversely of the aggregate current carrying capacities of said valves.

16. The method of operating an electric translating system comprising a plurality of electric valves, which comprises the steps of connecting one of said valves between an input circuit and an output circuit for the flow of current therebetween, regulating the conductivity of the said one of said valves in dependence upon variations of an operating condition of one of said circuits to impart to the said one of said valves a predetermined output voltage characteristic, connecting another of said valves between said circuits thereby modifying the relation between said operating condition and said voltage characteristic, and modifying the dependence of the regulation of the said one of said valves on the variations of the said operating condition to continue to impart to the said one of said valves the said output voltage characteristic.

HAROLD WINOGRAD.